(12) United States Patent
Namioka et al.

(10) Patent No.: US 7,341,355 B2
(45) Date of Patent: Mar. 11, 2008

(54) ANTI-GLARE OPTICAL FILM AND PROCESS FOR PREPARING THE SAME

(75) Inventors: Makoto Namioka, Niihama (JP); Masato Kuwabara, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 119 days.

(21) Appl. No.: 10/909,839

(22) Filed: Aug. 3, 2004

(65) Prior Publication Data

US 2005/0063066 A1 Mar. 24, 2005

(30) Foreign Application Priority Data

Aug. 13, 2003 (JP) ............... 2003-207460
Apr. 19, 2004 (JP) ............... 2004-122634

(51) Int. Cl.
*G02B 27/00* (2006.01)
*G02B 13/20* (2006.01)

(52) U.S. Cl. .............. 359/601; 359/599; 359/613; 359/831

(58) Field of Classification Search ............ 359/599, 359/707, 831–837, 577–590, 601–613
See application file for complete search history.

(56) References Cited

U.S. PATENT DOCUMENTS

| | | | | |
|---|---|---|---|---|
| 4,013,465 A | * | 3/1977 | Clapham et al. | 430/11 |
| 4,114,983 A | * | 9/1978 | Maffitt et al. | 359/580 |
| 4,497,860 A | * | 2/1985 | Brady, Jr. | 428/156 |
| 5,584,556 A | * | 12/1996 | Yokoyama et al. | 362/625 |
| 6,369,950 B1 | * | 4/2002 | Umemoto | 359/628 |
| 6,396,634 B1 | * | 5/2002 | Ishikawa et al. | 359/599 |
| 6,835,440 B1 | * | 12/2004 | Konishi et al. | 428/156 |
| 6,845,212 B2 | * | 1/2005 | Gardiner et al. | 385/146 |
| 6,963,451 B2 | * | 11/2005 | Se et al. | 359/599 |

FOREIGN PATENT DOCUMENTS

| | | | | |
|---|---|---|---|---|
| JP | 64-019301 | 1/1989 | | |
| JP | 05-341123 | 12/1993 | | |
| JP | 06-016851 | 1/1994 | | |
| JP | 07-181306 | 7/1995 | | |
| JP | 7-294708 | 11/1995 | | |
| JP | 10-20103 | * | 1/1998 | 359/599 |
| JP | 8-334608 | 12/1998 | | |
| JP | 2002-090732 | 3/2002 | | |
| JP | 2002-365410 | 12/2002 | | |
| JP | 2003-004903 | 1/2003 | | |
| JP | 2004-90187 | 3/2004 | | |

* cited by examiner

*Primary Examiner*—Thong Q. Nguyen
(74) *Attorney, Agent, or Firm*—Foley & Lardner LLP (57) ABSTRACT

An anti-glare optical film which reduces in whitening of a screen without sacrificing anti-glare property, and a process for preparing the same. There is provided an anti-glare optical film has an irregular surface, wherein a ratio of areas of the surface having an inclination angle of 1° or less is 20% or less, a ratio of areas of the surface having an inclination angle of 5° or more is 20% or less, and a standard deviation of a height of the surface is 0.2 µm or less. There is also provided a process for preparing an anti-glare optical film.

5 Claims, 7 Drawing Sheets

(A) Blast treatment (B) Etching (C) Transfer to film (D) Peeling from template

ANTI-GLARE OPTICAL FILM AND PROCESS FOR PREPARING THE SAME

BACKGROUND OF THE INVENTION

1. Field of the Invention

The present invention relates to an optical film imparted property of preventing glare, which is used in a polarizing film of an image displaying device, and a process for preparing the same.

2. Description of the Related Art

Visibility of an image displaying device including a liquid crystal displaying device is remarkably deteriorated when the outdoor daylight is reflected on its image displaying surface. In utilities requiring high quality of image such as a television and a personal computer, utilities used in outdoor where the outdoor light is intense such as a video camera and a digital camera, and utilities which perform display utilizing the reflected light such as a reflecting-type liquid crystal displaying device such as a portable phone, the surface of a displaying device is generally treated for preventing the reflecting thereon. Reflecting on preventing treatment is roughly classified into non-reflecting treatment by interference between layers of an optical multilayered film, and so-called glare preventing treatment by forming fine irregularities on the surface to scatter the incident light, and gradating a reflected on image. The cost of former non-reflecting treatment is high due to necessity of formation of a multilayered film having a uniform optical film thickness. To the contrary, since the latter glare preventing treatment can be realized at a relatively low cost, the treatment is used for, for example, a large scale personal computer and a large scale monitor. Glare preventing treatment is also called non-glare treatment or anti-glare treatment, and has previously been performed, for example, by a method of coating, on a transparent substrate, a ultraviolet curable resin with a filler dispersed therein, drying this, irradiating with ultraviolet-ray to cure the resin, whereby, the filler shape is transferred to the surface of the film to form random irregularities. Thus obtained layer provided with property of preventing glare (anti-glare property) is also called non-glare layer or anti-glare layer.

Previously, there have been many proposals for forming fine irregularities on the surface of the film used in an image displaying device to impart property of preventing glare. For example, JP-A No. 7-181306 and JP-A No. 5-341123 describe a non-glare layer composed of a cured film of a ultraviolet curable resin containing a fine particle as a filler.

In addition, JP-A No. 6-16851 describes a method of obtaining a scratch-resistance anti-glare film with an anti-glare layer formed thereon, by using a mat-like shaping film having fine irregularities on the surface, coating an ionizing radiation curable resin composition or a thermosetting resin composition on a transparent substrate, laminating the aforementioned shaped film on this coating film in the uncured state, irradiating with ionizing radiation or heating to cure a coating film, and peeling the shaping film.

JP-A No. 2003-4903 discloses a glare preventing film having an anti-glare layer on a transparent support and having a concave part and a convex part on the surface, wherein an area of a cross-sectional side of each concave part is 1,000 µm² or less. Herein, a ultraviolet curable resin in which a particle having an average particle diameter of 0.2 to 10 µm is dispersed is coated on a transparent support, and this is cured with ultraviolet ray to prepare an anti-glare film having irregularities.

However, when an anti-glare layer is constructed of a cured ultraviolet curable resin containing a filler, to manifest sufficient anti-glare property, since back scattering of the outdoor daylight due to a filler occurs, and the reflected light is distributed in a wide range, a wide range of a scattered component of the outdoor daylight is observed in a direction of an observer, and so-called whitening is observed in which a whole of a screen becomes white.

In addition, in an even a method of obtaining anti-glare surface having no filler by a method of transferring a shape using a mat-like shaping film, since a reflected light distribution depends on a shape of a shaping film as a template, it can not be said that this method is not necessarily sufficient to prevent whitening. JP-A No. 6-16851 describes that a matting agent such as a filler is not used in an anti-glare layer. However, as a method of forming irregularities on a shaping film, only a method of coating a composition composed of a filler and a binder resin on a substrate film to transfer the shape of the filler is disclosed and, since distribution of a filler and, consequently, arrangement of irregularities becomes random, it is thought that sufficient prevention of whitening can not be performed.

Generally, as a method of reducing whitening, formulation of reducing an amount of a filler to be added in order to reduce a diffused component of the reflected light, and formulation of downsizing an average particle diameter of a filler are contemplated. However, according to these formulations, a proportion of a flat surface of an anti-glare surface is increased at the same time, causing clarity of an image of the reflected on outdoor daylight, and anti-glare property is deteriorated.

On the other hand, JP-A No. 2002-365410 discloses an optical film having the surface on which fine irregularities are formed, wherein when the light is introduced on the surface of the film from a direction at −10° relative to a normal, and only the light reflected from the surface is observed, a profile of the reflected light satisfies a specified relationship. And, it is described that, in order to give such the reflection profile, it is preferable that the surface is of a multiple spherical shape having substantially no flat part.

In addition, although not directly related to an anti-glare optical film, the technique of etching the surface of a glass with hydrofluoric acid is known. For example, JP-A No. 2002-90732 describes that a concave part having an average diameter of around 6 µm is formed on the surface of a glass by two-stage etching using hydrofluoric acid, and a glass on which irregularities are formed like this is used as a reflection plate for a liquid crystal display panel. A most general glass is a soda-lime glass. However, the previously known glare preventing-treated film has not necessarily sufficient effect of preventing the aforementioned whitening, and it can not be said that sufficient visibility is obtained.

SUMMARY OF THE INVENTION

The present invention is made in view of the above circumstances, and an object thereof is to provide an anti-glare optical film which reduces whitening of a screen without deteriorating anti-glare property, and a process for preparing the same. Another object of the present invention is to provide an anti-glare optical film which is suitably used on the surface of various displays including a liquid crystal displaying device, is small in whitening of a screen, and exhibits high effect of preventing glare.

That is, according to the present invention, there is provided an anti-glare optical film having irregularities on the surface, wherein a ratio of areas of the surface having an inclination angle of 1° or less is 20% or less, a ratio of areas of the surface having an inclination angle of 5° or more is 20% or less, and a standard deviation of a height of the surface is 0.2 µm or less.

In this anti-glare optical film, it is advantageous that a reflectivity towards a direction shifted from a specular reflection angle by 20° is 0.001% or less. In addition, it is advantageous that a 45° reflection clarity measured using an optical comb having a width between a dark part and light part of 1.0 mm is 50% or less. Further, it is advantageous that a total value of transmittance clarity measured using four kind of optical combs having a width between a dark part and a light part of 0.125 mm, 0.5 mm, 1.5 mm and 2.0 mm is 200% or more. Further, it is advantageous that this glare preventing optical film has a haze of 10% or less.

Also, according to the present invention, there is provided a process for preparing an anti-glare optical film, comprising the steps of:

contacting a glass with an aqueous solution containing hydrogen fluoride to obtain a template which comprises the glass having the surface on which a fine irregular shape is formed so that approximately spherical concave shapes are arranged to be substantially compact; and transferring the irregular shape of the surface of the template onto the surface of a resin film. Herein, it is advantage that the glass is a quartz glass or a borosilicate glass.

It is advantageous that a fine flaw is formed on the surface of a glass before contact with an aqueous solution containing hydrofluoric acid. Then, according to the present invention, there is also provided a process for preparing an anti-glare optical film, comprising the steps of:

forming fine flaw on a surface of a glass, contacting the glass with an aqueous solution containing hydrogen fluoride to obtain a template which comprises the glass having the surface on which a fine irregular shape is formed; and transferring the irregular shape of the surface of the template onto the surface of a resin film. Also in this case, it is advantageous that a glass is a quartz glass or a borosilicate glass.

A fine flaw on the glass surface can be formed, for example, by blast treatment onto the glass surface, and it is preferable that a depth of treatment is 10 µm or less. It is advantageous that this blast treatment is performed by using beads having substantially monodisperse particle diameter distribution. It is preferable that the beads have an average particle diameter of 180 µm or less. And, it is preferable that blast treatment is performed at a blast pressure of 0.01 to 0.05 MpA, and at condition under which a flaw is formed so that almost spherical concave shapes are formed substantially compactly on the glass surface by contact with an aqueous solution containing hydrogen fluoride thereafter. In addition, in a step of contacting a glass with a fine flaw formed thereon with a hydrogen fluoride-containing aqueous solution, it is advantageous that etching is performed until an etching depth becomes 10-fold or more of an average depth of a pre-formed fine flaw.

In each of the above methods, when a tubular glass is used, the aforementioned fine irregular shape is formed on its outer surface, and this is used as a template, transfer of the irregularity onto a resin film can be continuously performed.

In addition, in the aforementioned each method, a resin film can be constructed of, for example, a thermoplastic transparent resin and, in this case, an irregular shape of a template is transferred onto the surface by thermal press. On the other hand, a resin film may be such that an ionizing radiation curable resin layer is formed on the surface of a transparent substrate film and, in this case, an irregular shape of a template is transferred onto a resin layer after curing by contacting the ionizing radiation curable resin layer with a template, and irradiating with ionizing radiation to cure the resin layer.

DETAILED DESCRIPTION OF THE INVENTION

Figure 2:
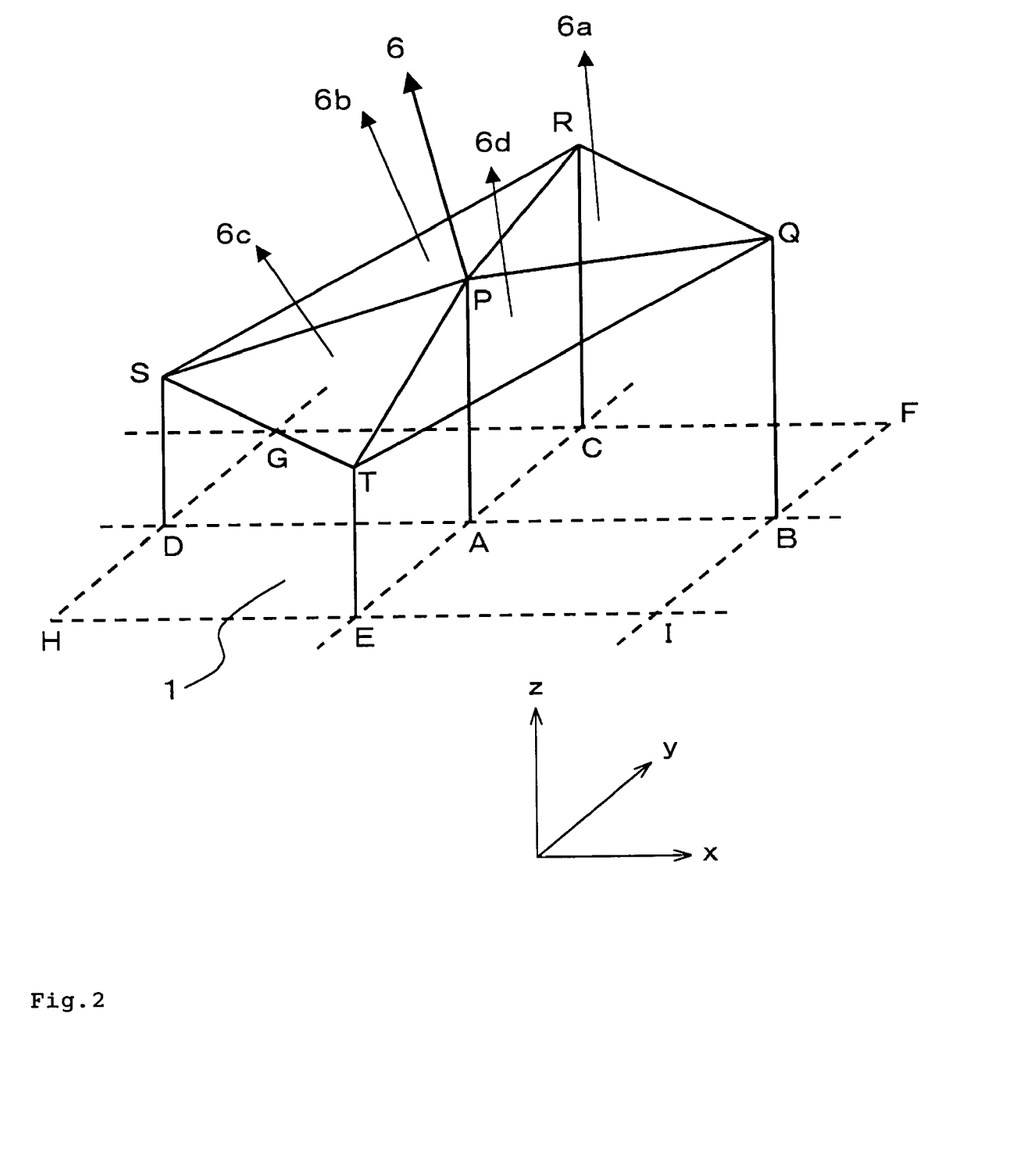
FIG. 2 is a perspective view for explaining a method of measuring an inclination angle of the surface.
Figure 3:
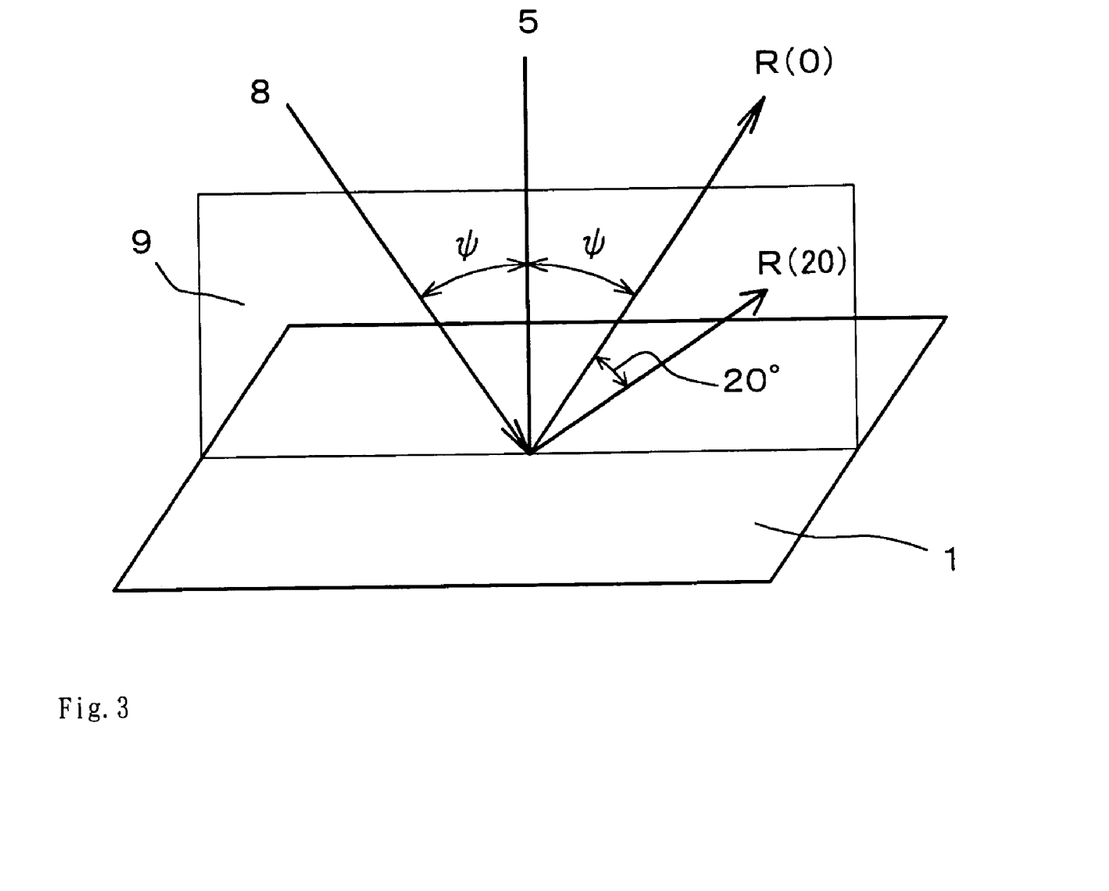
FIG. 3 is a perspective view for explaining reflectivity in a direction shifted from a specular reflection angle by 20°.

The present invention will be explained in more detail referring to the attached drawings. In the drawings, FIG. 1 indicates outline of the surface of an anti-glare optical film, and is a perspective view for explaining an inclination angle of the surface. FIG. 2 is a perspective view for explaining a method of measuring an inclination angle of the surface. FIG. 3 is a perspective view for explaining a reflectivity towards a direction shifted from a specular reflection angle by 20°.

Figure 1:
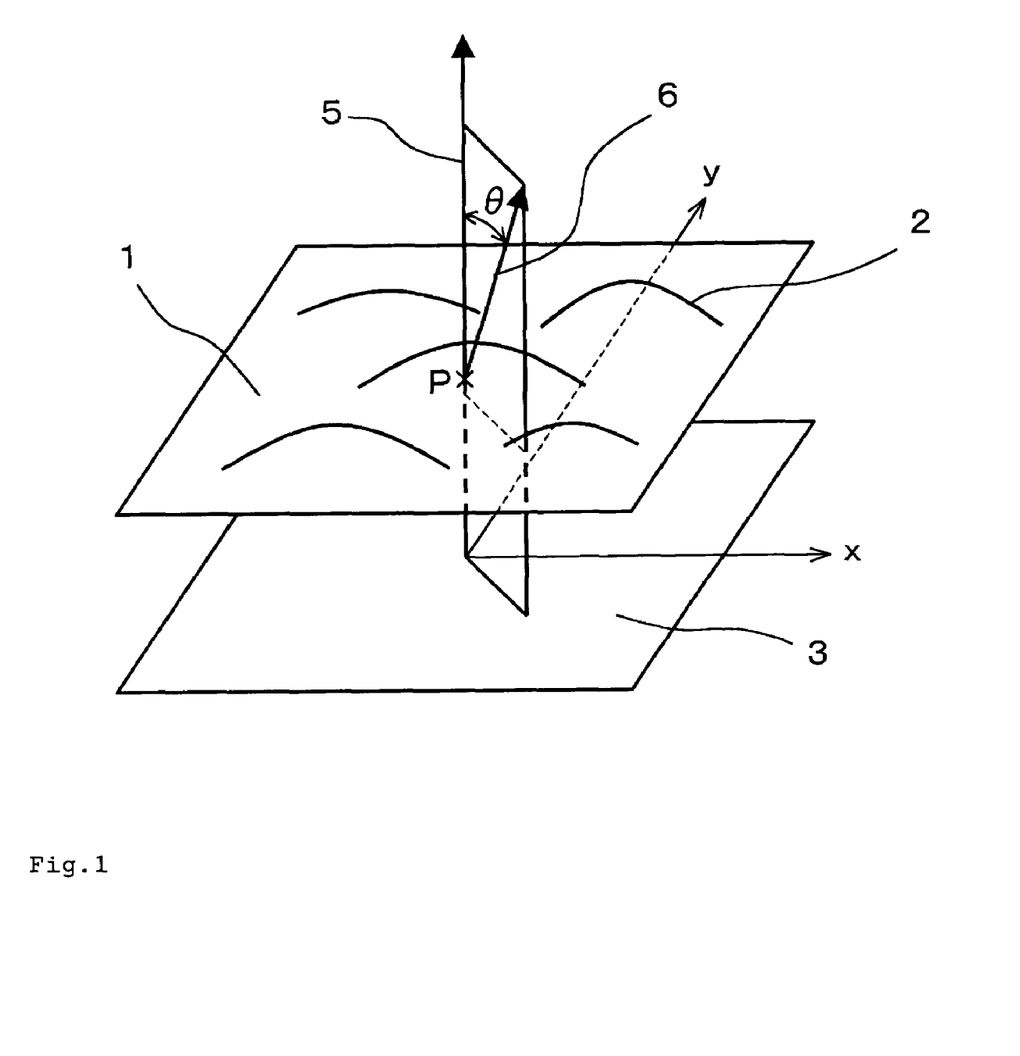
FIG. 1 shows outline of the surface of an anti-glare optical film, and is a perspective view for explaining an inclination angle of the surface.

Referring to FIG. 1, the anti-glare optical film 1 of the present invention has the surface on which fine irregularities 2 are formed, and this matter itself is not different from the previously known glare preventing film at all. In the present invention, a ratio of planes of an inclination angle of the surface of 1° or less is 20% or less, a ratio of planes of an inclination angle of 5° or more is 20% or less, and a standard deviation of a height is 0.2 µm or less.

Herein, an inclination angle of an anti-glare film having the surface on which irregularities are formed means an angle θ formed by a local normal 6 in view of irregularity there relative to a main normal 5 of a film, that is, a normal at an average plane of a film, at an arbitrary point P on the surface of the film 1. In FIG. 1, an orthogonal coordinate in a film plane is expressed by (x,y), and a plane of a whole film is expressed by a projected plane 3.

An inclination angle of the film surface can be obtained from a three-dimensional shape of surface roughness measured using a non-contact three-dimensional surface shape/roughness measuring device. A horizontal resolution required for a measuring device is at least 5 µm or less, preferably 2 µm or less, and a vertical resolution is at least 0.1 µm or less, preferably 0.01 µm or less. A non-contact three-dimensional surface shape/roughness measuring device suitable for this measurement is a product of USA Zygo Corporation, and "New View 5000" series available from Zygo Co., Ltd. in Japan. A wider measuring area is preferable, at least 100 μm×100 μm or more, preferably 500 μm×500 μm or more.

Specifically, as shown in FIG. 2, an attention point A on a film average plane FGHI shown by a dotted line is determined; a point B and a point D are taken at approximately symmetry relative to an attention point A, in a vicinity of the point A on a x-axis through the point A; a point C and a point E are taken at approximately symmetry relative to an attention point A, in a vicinity of the point A on a y-axis through the point A; and points Q, R, S and T on a film plane corresponding to these points B, C, D and E are determined. In FIG. 2, an orthogonal coordinate on a film plane is expressed by (x,y), and an coordinate in a direction of a film thickness is expressed by z. A film average plane FGHI is a plane formed by intersecting points F, G, H and I with a straight line parallel with a x-axis thorough a point C on a y-axis, a straight line parallel with a x-axis through a point E on a y-axis, a straight line parallel with a y-axis through a point B on a x-axis, and a straight line parallel with a point D on a x-axis, and necessarily constructs a film average plane. In FIG. 2, an actual position of a film plane is drawn above a film average plane FGHI, but an actual position of a film plane is naturally above a film average plane depending on a position taken by an attention point A in some case, or below the plane in some cases.

And, an inclination angle of the resulting surface shape data can be obtained by obtaining a polar angle of an average normal vector 6 obtained by averaging respective normal vectors 6a, 6b, 6c and 6d of polygon four planes, that is, four triangles PQR, PRS, PST and PTQ formed by a total five points of a point P on an actual film plane corresponding to an attention point A, and points Q, R, S and T on an actual film plane corresponding to four points B, C, D and E taken in a vicinity thereof. An inclination angle is obtained for respective measurement points, a histogram is calculated. A standard deviation of concave and convex heights is directly calculated from the resulting surface shape data.

In the present invention, it is controlled so that a ratio of planes having the thus calculated inclination angle of the surface of 5° or more is 20% or less. When this ratio exceeds 20%, a screen becomes whitely due to scattering, causing so-called whitening, control on screen information is reduced, and visibility is remarkably reduced, being not preferable.

In addition, a ratio of planes having an inclination angle of the surface of 1° or less is controlled to be 20% or less. When this ratio exceeds 20%, clarity of the reflected on outdoor daylight is increased, and this inhibits visibility, being not preferable. Therefore, in the anti-glare optical film of the present invention, 60% or more of total irregular surface has an inclination angle in a range of 1° or more to 5° or less.

In this anti-glare optical film, a standard deviation of concave and convex heights on the surface is controlled to be 0.2 μm or less. When this standard deviation exceeds 0.2 μm, deterioration of screen information becomes remarkable, and visibility is inhibited, being not preferable.

The anti-glare optical film of the present invention is preferably such that a reflectivity towards a direction shifted from a specular reflection angle by 20° is 0,001% or less. Herein, a specular reflection angle refers to as follows. As shown in FIG. 3, when the light 8 is introduced at an angle ψ, relative to a main normal 5 of a film 1, an angle between a direction of the light R(0) which reflects at an angle ψ in a direction opposite to an incident light direction 8 in a plane 9 including the normal 5 and an incident light direction 8, and a main normal 5 is a specular reflection angle. ψ is an incident angle, and maybe also a reflection angle and, strictly, the sign is reverse of positive and negative. And, a direction shifted from a specular reflection angle by 20° is a direction R(20) shifted from a direction of R(0) by 20°, as shown in FIG. 3 In addition, this anti-glare optical film is preferably such that a 45° reflection clarity measured using an optical comb having a width between a dark part and a light part of 1.0 mm is 50% or less. A 45° reflection clarity can be obtained according to the method of measuring image clarity by a reflection method prescribed in JIS K 7105. An incident direction and a reflection direction of the light to a test sample at measuring are made to be 45° according to the provision of this JIS. This JIS prescribes four kinds of optical combs having a ratio of a width between a dark part and a light part of 1:1, wherein the width is 0.125 mm, 0.5 mm, 1.0 mm and 2.0 mm. A 45° reflection clarity prescribed herein is a value when an optical comb having a width between a dark park and a light part of 1.0 mm is used.

Further, this anti-glare optical film is preferably such that a total value of transmittance clarities measured using four kinds of optical combs having a width between a dark part and a light part of 0.125 mm, 0.5 mm, 1.0 mm and 2.0 mm is 200% or more. Transmittance clarity is similarly obtained according to the method of measuring image clarity by a transmittance method prescribed in JIS K 7105. An incident direction of the light to a sample piece is a vertical direction according to the provision of JIS. And, in this case, image clarity by a transmittance method is measured using the aforementioned four kinds of optical combs, and a total value of them is a total value of the aforementioned transmittance clarity.

Further, the anti-glare optical film of the present invention has preferably a haze of 10% or less. A haze value can be measured by a single beam method prescribed in JIS K 7361-1. A haze value is a value expressed by (diffusion transmittance/total light transmittance)×100 (%). In the anti-glare optical film of the present invention, a haze value measured by this method is generally 20% or less, a haze value of 10% or less is preferable, and a haze value of 5% or less is further preferable. If a haze value is too high, when this glare preventing optical film is applied to a display device, in particular, a liquid crystal display device, since the low contrast light emitted at a direction inclined from the normal, in particular, a direction inclined at 60° or more is scattered in a front direction, and this is observed, due to field angle property of a liquid crystal display device, contrast when observed from a front is reduced.

The anti-glare optical film of the present invention can be made such that, when a white/black pattern arranged parallel downward by 10 mm is observed through the anti-glare film, an obscure value of a transmitted image is 5 μm or less.

A film having the aforementioned surface shape can be prepared, for example, by a method of ultraviolet-curable a ultraviolet-curable resin in the state where a transparent substrate coated with a ultraviolet-curable resin is adhered to an emboss template having an appropriate surface shape.

A process for preparing a film having a specified surface shape which is another present invention will be explained below.

In the present invention, a glass having the surface on which fine irregularities are formed by a prescribed method is used as an emboss template. As an original sheet of this emboss template, a general glass containing $SiO_2$ as a main component can be used. A glass may be a soda-lime glass called blue glass, a borosilicate glass called white glass, or a quartz glass. A glass can be used without limitation as far as it is a glass which can be etched with an aqueous solution containing hydrogen fluoride, and is isotropically dissolved with this aqueous solution. However, since a glass is exposed to a step of thermal press, or irradiation with ionizing radiation in the state where a transparent substrate coated with an ionizing radiation curable resin is adhered to the irregular surface, at a step of transferring a fine irregular shape produced on the surface with etching, onto a transparent resin film, a glass is desirably a material which stands these treatments. Therefore, it is desired that a material of a glass has high resistance to heat or ionizing radiation, and has a high mechanical strength. For this reason, a borosilicate glass or a quartz is preferably used.

In addition, when an emboss template is cylindrical, since a continuous film can be continuously subjected to emboss processing, it is preferable that a glass has a cylindrical shape.

From a viewpoint that a cylindrical or tubular glass is comparatively easily available, it is preferable that a material of a glass is a borosilicate glass or a quartz glass.

A borosilicate glass is sold by Corning Corporation (Asahi Techno Glass Co., Ltd. in Japan) or Schott Corporation under a trade name of Pyrex or Tempax, and these may be used.

A glass is etched by contacting with an aqueous solution containing hydrogen fluoride. By this etching, a fine irregular shape is formed on the surface such that concave shapes composed of approximately spherical surfaces are disposed substantially compactly. For doing so, it is preferable that a fine flaw is produced on the surface of a glass in advance.

JP-A No. 2002-90732 describes that a glass on which irregularities are formed by such the method is used as a reflection plate for a liquid crystal display panel. Specifically, it is described that primary etching is performed with an etching solution containing hydrogen fluoride and an ammonium fluoride, to form an ununiform protecting membrane on the surface of a glass, with an insoluble salt produced by a reaction with $SiO_2$ which is a main component of a glass, whereby etching with hydrofluoric acid proceeds ununiformly, to form a fine concave part on the surface and, thereafter, secondary etching is performed with a secondary etching solution not containing an ammonium compound and substantially containing only hydrofluoric acid, and a semi-spherical concave curved surface is formed starting at the concave part as an etching origin. Irregularities are formed on the glass surface by such the two-stage etching, and this can be used as a template in the present invention.

However, in a borosilicate glass and a quartz glass for which a roll shape is easily realized, since an etching rate of a glass itself is slow, there is no balance between condition of precipitation of an insoluble salt and condition of formation of surface irregularities therefrom, and it can not be said that stability of irregularity formation using ammonium fluoride is high. In order to avoid such a disadvantage, the present inventors found that it is effective that a fine flaw (crack) is produced on the glass surface before etching, and etching is performed with an aqueous solution containing hydrogen fluoride in this state. Examples of a method of producing a fine flaw on the glass surface include blast treatment.

Then, a method using, as a template, a glass having the surface on which a fine irregular shape is formed by forming a fine flaw on the surface, and contacting this with an aqueous solution containing hydrogen fluoride, and transferring the irregular shape on the regular shape on the surface onto the surface of a resin film will be explained based on FIGS. 4A to 4D showing each step by a schematic cross-sectional view.

FIG. 4A shows an example where blast treatment is adopted by means for producing a flaw (crack) 11 on the surface of a glass 10. When a blast agent 20 is collided against the surface of a glass 10 at an appropriate pressure, fine flaws 11, 11 are formed.

Then, in an etching step shown in FIG. 4B, this glass 10 is contacted with an aqueous solution containing hydrogen fluoride (etching solution) to perform etching. Thereupon, the etching solution is contacted with the surface of a glass 10 and, at the same time, is permeated into the interior of flaws 11, 11, reaches their tips, and dissolves contacting surfaces successively. Then, a concave part is successively expanded concentrically at a center of tips of flaws 11, 11. FIG. 4B shows, with a broken line, circumstances where starting with a glass plane 13, a glass is successively dissolved to glass planes 14, 15 during etching. At completion of etching, a fine irregular shape is formed so that many concave shapes 16 of approximately spherical surface are disposed substantially compactly, and a glass template 18 is obtained.

Using the thus obtained glass template 18, as shown in. FIG. 4C, the irregular plane 16 is transferred onto a film 30. The film 30 may be constructed of one thermoplastic transparent resin and, in this case, a thermoplastic resin film 30 is pushed against an irregular plane 16 of a template 18 in the heated state, and may be shaped by thermal press. Alternatively, the film 30 may be constructed such that an ionizing radiation curable resin layer 32 is formed on the surface of a transparent substrate film 31, as exemplified in FIG. 4C and, in this case, the ionizing radiation curable resin layer 32 is contacted with an irregular plane 16 of a template 18, and ionizing radiation is irradiated to cure the resin layer 32, whereby, an irregular shape of a template 18 is transferred onto an ionizing radiation curable resin layer 32. These films will be explained in detail below.

After transference of an irregular shape of a template 18, as shown in FIG. 4D, the film 30 is peeled from the template 18 to obtain an anti-glare optical film is obtained.

Figure 4:
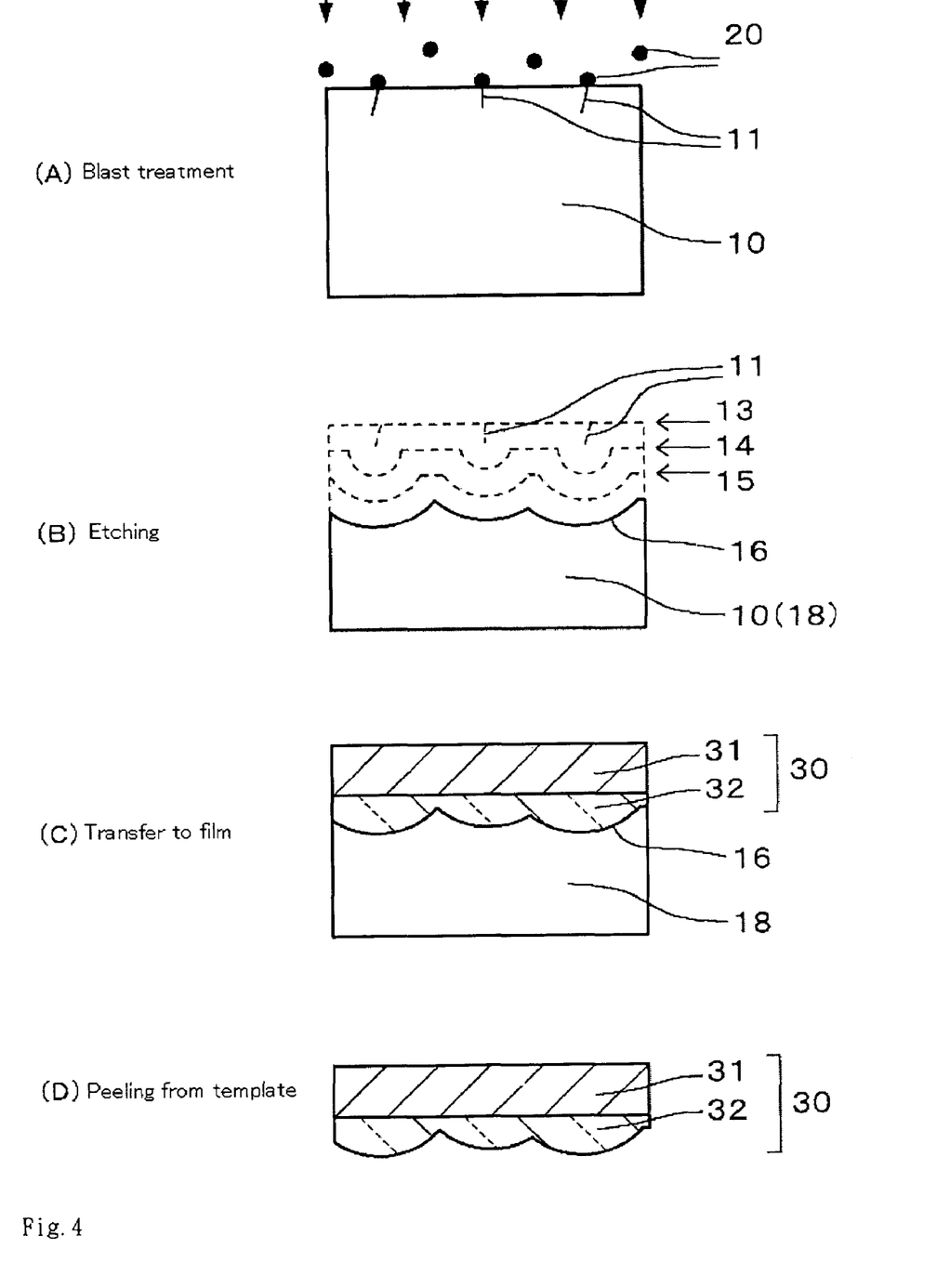
FIGS. 4A to 4D show one preferable aspect of the present method by a schematic cross-sectional view every step.
Figure 5:
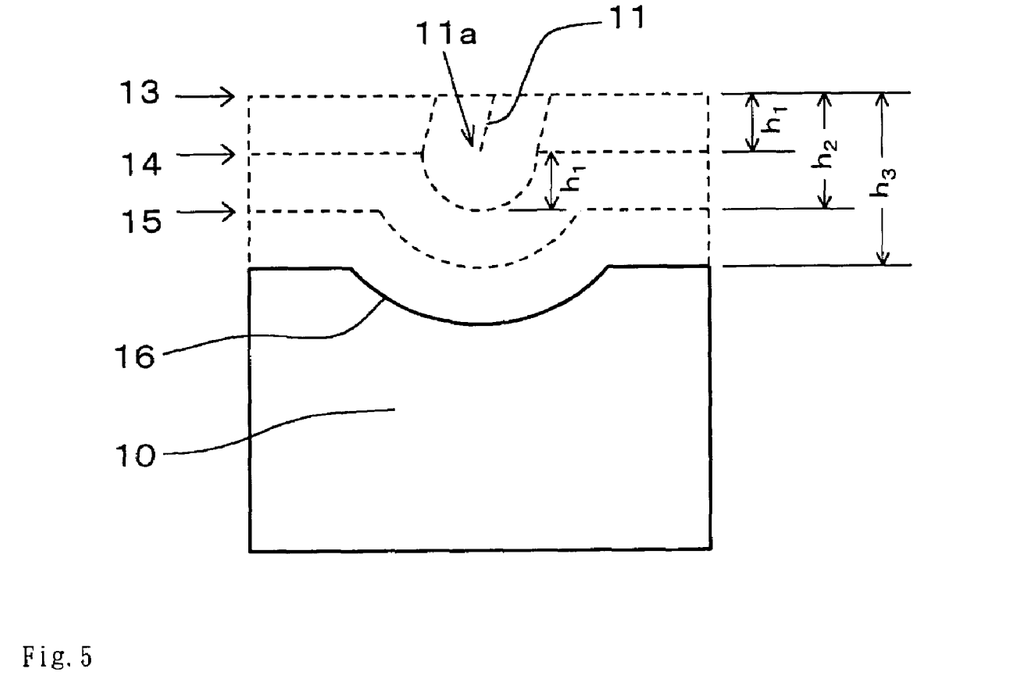
FIG. 5 is a cross-sectional view schematically showing circumstance of etching progression.

Circumstance of progression of etching shown in FIG. 4B will be explained in more detail by paying an attention to only one flaw 11 and referring to FIG. 5 showing by further enlarging the part. Also in this figure, an initial glass plane is expressed by a symbol 13, it is displayed that as etching progresses, a glass is dissolved successively to glass planes 14, 15 and, at completion of etching, an irregular plane 16 is formed.

It is supposed that a flaw 11 is formed as in FIG. 5. When a glass 18 is contacted with an etching solution in this state, an etching solution is contacted with the glass surface and, at the same time, and is permeated into the interior of a flaw 11, reaching its tip 11a. And, an etching solution dissolves apart of a contacting glass successively. That is, dissolution (etching) gradually progresses planarly from an initial glass plane 13 and, at the same time, a glass is dissolved from a flaw 11 traversely, and a glass is dissolved from its tip 11a in a semi-spherical manner. Now, it is supposed that etching has progressed from an initial glass plane 13 to a depth $h_1$ (glass plane 14) approximately equal to a depth of a flaw 11, an etching plane beginning at a tip 11a of a flaw 11 has a radius of approximately $h_1$, and becomes an approximately semi-spherical concave plane.

When etching further progresses, this concave plane is expanded concentrically with the aforementioned semi-sphere, and since a glass plane: is cut from a position of a symbol 14 to a position of a symbol 15 at the same time, a partial spherical surface having a large curvature radius and having a small inclination relative to the glass surface remains. FIG. 5 shows, also with a broken line, the state where etching has progressed to a depth $h_2$ which is about 2-fold a depth of a flaw 11, as a glass surface 15. Finally, a concave plane 16 which is a slight part of a spherical surface remains. A height $h_3$ from an initial glass plane 13 to a glass plane remaining at completion of etching is regarded as etching depth.

For convenience of figure production, FIG. 5 shows as if etching is completed at which etching has progressed to a depth which is about 3-fold a depth of flaw 11. However, actually, it is preferable that etching progresses to a further deep point.

Conversely speaking, it is preferable that a depth of a flaw 11 is much small as compared with an etching depth. In addition, it is shown as if a flat part remains also at completion of etching.

However, this is because a figure was drawn by paying an attention to only one flaw 11. Actually, since another concave plane is expanded also from a flaw at an adjacent position, a flat part does not substantially remain at completion of etching.

Like this, in the present invention, the surface of a glass is dissolved by etching to an extent and, in a preferable aspect, a fine flaw is formed on the surface of a glass prior to etching. Therefore, it is necessary that a glass to be used has a thickness to an extent, and it is preferable that the thickness is 1 mm or more, particularly 2 mm or more.

Returning to FIG. 4, by treating the surface of a glass 10 on which a fine flaw 11 has been produced by blast treatment, with an etching solution which progresses a dissolution reaction isotropically, many concave surfaces 16 which are substantially a spherical surface are produced on the surface of a glass 11. Since a size of a concave part produced by etching depends on a depth of a flaw 11 produced by blast treatment and an etching depth, it is required that blast treatment is performed as uniformly as possible. A domain of a multiple spherical surface produced by etching is expressed by simple Voronoi division.

Figure 6:
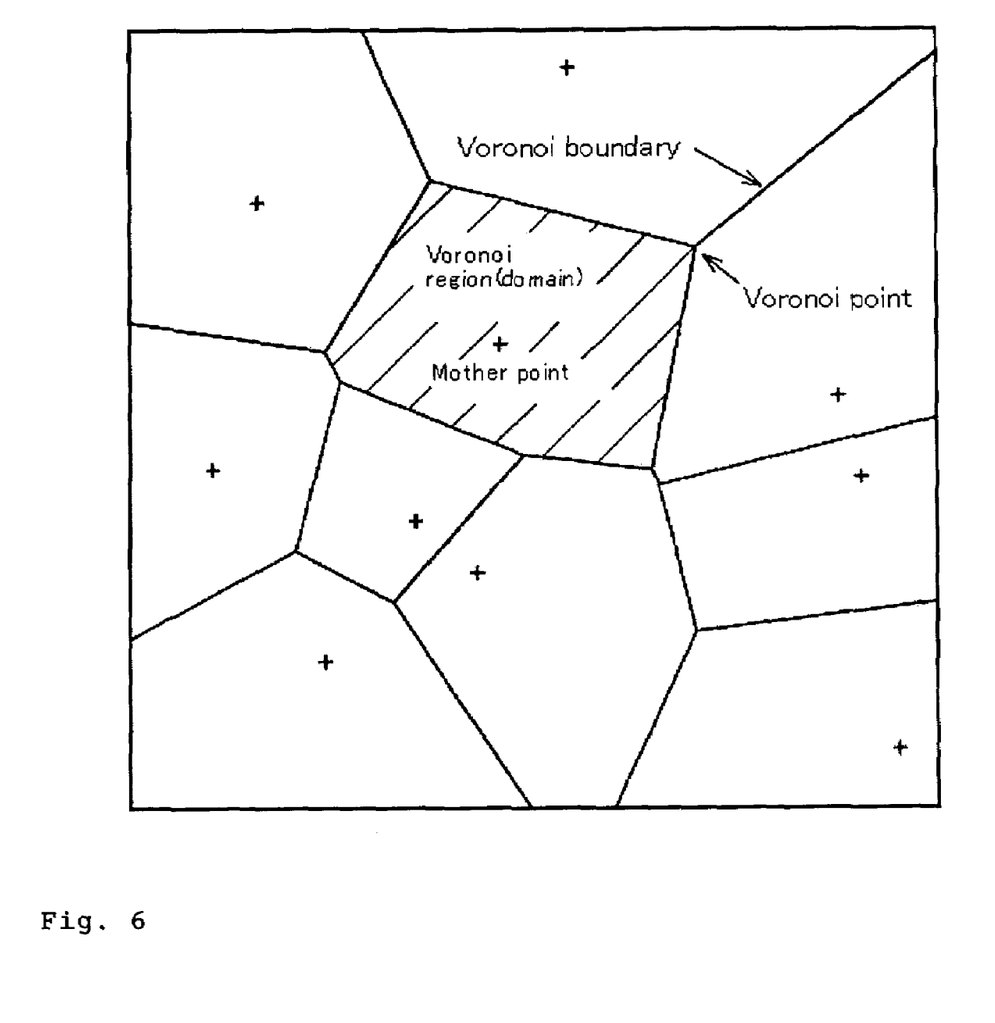
FIG. 6 is an example of Voronoi view for explaining Voronoi division.

Voronoi division will be explained based on FIG. 6 showing an example of a Voronoi view. As shown in this view, when some points (referred to mother point) are disposed on a plane, a view obtained by dividing the plane depending on to what a mother point an arbitrary point in the plane is nearest, is referred to as Voronoi view, and that division is referred to Voronoi division. An individual section containing one mother point obtained by division is referred to Voronoi region (or domain). In FIG. 6, an oblique line is given to only one Voronoi region. In an example shown by this figure, the number of mother points is 10, and a Voronoi region is divided into 10. In general, in a Voronoi view, the number of mother points is consistent with the number of Voronoi regions. A line of a boundary of a Voronoi is called Voronoi boundary, and an intersection of a Voronoi boundary is called Voronoi point.

In the present invention, as explained above, a concave multiple spherical surface is obtained by etching of a glass, and the concave multiple spherical surface is like Voronoi division as mentioned above by observation with microscope. However, Voronoi division is not performed by determining a mother point. While each domain construe spherical surface and a line in FIG. 3, which is corresponding to Voronoi boundary, is observed as a straight line from the view of upper side, the line is concave line from the longitudinal sectional view. An area of each domain of Voronoi division is preferably uniform.

It is preferable hat a blast agent 20 used in blast treatment is a bead having a particle diameter distribution near monodispersity as possible. When a blast agent has wide particle diameter distribution, since distribution of a depth of a fine flaw 11 is expanded, and distribution is generated in a Voronoi diameter of a spherical shape produced by etching, a possibility of occurrence of a larger sphere than a subpixel of a display device can not be neglected and, when disposed on a front of a display device, distribution of brightness of a pixel is produced, and so-called glittering is produced, being not preferable. Herein, particle diameter distribution "near monodispersity" or "substantially monodisperse" may be that a standard deviation is generally around within 20% relative to a median (average value) of a particle diameter. A standard deviation of particle diameter distribution is preferably within 15%, more preferably within 10% relative to a median.

In addition, it is preferable that a particle shape of a blast agent (bead) 20 is near a spherical shape. When a blast agent is a spherical, since an aspect of collision with a glass as blast treatment becomes single, this is effective for enhancing uniformity of a depth of a fine crack.

As described above, it is necessary that a depth of a fine flaw 11 produced by blast treatment is not too large, and a depth is specifically preferably 10 μm or less, particularly preferably 2 μm or less. When a depth of a flaw 11 exceeds 10 μm, an etching depth as described later exceeds 200 μm and, in this case, a size of a fine concave part 16 obtained as a result of etching becomes too large exceeding 100 μm, and a pattern becomes extremely rough, being not preferable.

An average particle diameter of a blast agent 20 can be appropriately selected depending on blast conditions, and is preferably 180 μm or less, more preferably 100 μm or less. When a particle diameter of a blast particle exceeds 180 μm, a blast pressure becomes extremely low when one tries to make a depth of a fine clack to be 2 μm or less, and blast operation itself becomes difficult. Examples of a commercially available blast agent which can be used for this purpose include a zirconia bead "TZ-B53" (average particle diameter: 53 μm), the same (TZ-B90) (average diameter: 90 μm) manufactured by Tosoh Co., Ltd., and Microzirconbeads "MB-20" (average particle diameter: 20 μm), and the same "MB-40" (average particle diameter: 34 μm) sold by Material Science Co., Ltd.

In order to make a depth of a fine crack 11 formed by blast treatment to be 2 μm or less, it is preferable that a blast pressure is selected from a range of 0.01 to 0.05 MPa (gauge pressure, same hereinafter) in conformity with a particle diameter of a blast agent. That is, such the condition is selected that a flaw is formed on the glass surface by later etching so as to form approximately spherical concave shapes substantially compactly. When a blast pressure grows larger, a size of a fine concave part obtained as a result of etching becomes too large, and a pattern becomes rough. On the other hand, when a blast pressure becomes too small, a blast particle causes elastic collision on the glass surface, and a density of an effective fine crack is dramatically decreased. A tendency that when a blast pressure is small, a density of an effective fine crack is decreased, is remarkably manifested when a blast particle is small as below 50 μm. In addition, when a blast pressure is below 0.01 MPa, stability of blast operation itself is decreased, being not preferable. Depending on a particle diameter of a blast agent, by appropriately combining with a particle diameter of a blast agent in a range of a blast pressure of 0.01 to 0.05 MPa, a fine flaw having a depth of 2 µm or less can be effectively produced on the glass surface at a high density.

As an amount of a blast agent necessary for blast is 10 g or more per 4 cm² of a glass area. When the amount is below 10 g, since a density of an effective fine crack is deficient, a concave part produced after etching becomes too sparse. For this reason, a ratio of a flat part becomes large, the glare preventing performance of the anti-glare film obtained as a result of transference of a shape is insufficient, and an outline of an image reflected on the surface of the anti-glare film can not be clearly confirmed with naked eyes. In order to make sufficient the glare preventing performance of the resulting glare preventing film, a blast agent should be used at 10 g or more, preferably 100 g or more per 4 cm² of a glass area, whereby the glare preventing performance can be assuredly exerted.

An etching depth is preferably 10-fold or more, further preferably 20-fold or more, particularly preferably 50-fold or more an average depth of fine flaws produced by blast. When an etching depth is below 10-fold relative to an initial flaw depth, a multiple spherical surface approaches a hemisphere and, as a result, wide angle reflection of the resulting glare preventing film is increased and, as a result, an image becomes very whitely. By making an etching depth to be 20-fold or more relative to an initial flaw depth, a maximum inclination angle of a multiple spherical surface can be reduced low and, as a result, random reflection of the resulting glare preventing film in a wide angle direction can be suppressed low, therefore, an anti-glare surface not causing whitening can be obtained. An etching depth is preferably 300 µm or less and 100 µm or more, particularly preferably 100 to 200 µm.

A Voronoi diameter expressed by a root of an area of each domain of Voronoi division is an etching depth or less. Empirically, when an etching depth exceeds 500 µm, since a Voronoi diameter becomes 200 to 500 µm, a glare surface becomes rough, being not preferable. When this glare preventing film is applied to an image display device such as a liquid crystal display device, it is preferable that a Voronoi diameter is smaller than a pixel size. When an anti-glare film having a size considerably exceeding this is disposed on a display device, a variation is generated in brightness of a pixel, and so-called glittering occurs, being not preferable. Since each of red, green and blue pixels of a liquid crystal display device is usually 250 µm or less, a Voronoi diameter is preferably 200 µm or less, further preferably 100 µm or less, particularly preferably 50 µm or less. For this reason, an etching depth is preferably 300 µm or less, further preferably 100 to 200 µm.

Although a necessary etching time varies depending on a kind of a glass, a concentration of an etching solution, and etching condition, even when any condition is adopted, by performing etching so that an etching depth is 100 to 300 µm, approximately equal result can be obtained.

It is enough that an etching solution contains hydrogen fluoride and has ability to dissolve $SiO_2$ which is a main component of a glass. From such a viewpoint, a concentration of hydrogen fluoride (HF) is appropriately selected from a range of 1 to 50% by weight. When a concentration of hydrogen fluoride is too small, ability to dissolve $SiO_2$ or an etching rate is extremely reduced. On the other hand, when a concentration becomes too high, hydrogen fluoride itself easily volatilized. A concentration of hydrogen fluoride in an etching solution is preferably 5% by weight or more, further preferably10% by weight or more, preferably 40% by weight or less, and further preferably 35% by weight or less. In order to increase stability of etching or an etching rate, an ammonium salt such as ammonium fluoride, or a protonic acid such as hydrochloric acid, sulfuric acid, nitric acid and acetic acid may be added to an etching solution.

An etching temperature should be appropriately set in order to obtain a necessary etching rate, and is preferably in a range of 10 to 60° C., particularly preferably 20° C. or more and 50° C. or less. Since a practical etching rate is not obtained at 10° C. or less and, additionally, crystallization of the reaction product of $SiO_2$ and hydrogen fluoride occurs, precipitating on the glass surface, there is a tendency that the resulting fine irregular surface easily becomes rough, and surfaces other than a multiple spherical surface shape are formed and, as a result, an anti-glare surface is easily whitened. On the other hand, when an etching temperature exceeds 60° C., change in a solution composition occurs during etching due to evaporation of hydrogen fluoride, being not preferable.

After completion of etching, a glass is sufficiently washed with pure water, and dried, which is used as a template for emboss processing.

The thus obtained glass having an irregular shape on the surface is used as a template 18 for transferring the shape onto the surface of a film 30 as already explained referring to FIG. 4D. That is, an irregular shape of a template is transferred onto the surface of a transparent resin film by a method of pushing a thermoplastic resin film against an irregular surface of a template by thermal press, or a method of adhering a transparent resin substrate film coated with an ionizing radiation curable resin to an irregular surface of a template on its ionizing radiation curable resin-coated layer side, and irradiating with ionizing radiation to curing it.

A transparent resin used for this reason may be any one as far as it is a film having practically optical transparency. As a specific resin, there can be exemplified cellulose resins such as triacetylcellulose, diacetylcellulose, and cellulose acetate propionate, cycloolefin polymer, polycarbonate, polymethyl methacrylate, polysulfone, polyether sulfone, and polyvinyl chloride. The cycloolefine polymer is a resin using a cyclic olefin such as norbornene and dimethanoocta­hydronaphthalene as a monomer and, examples of a commercially available product include "Arton" sold by JSR Co., Ltd., and "Zeonor" and "Zeonex" (all trade name) sold by Nippon Zeon Co., Ltd.

Among them, a transparent resin film having thermoplasticity comprising as polymethyl methacrylate, polycarbonate, polysulfone, polyether sulfone, and cycloolefin polymer can be used for transferring an irregular shape of the surface of a glass template onto the film surface by pressing or adhering to a glass template having an irregular shape at an appropriate temperature, followed by peeling.

On the other hand, as an ionizing radiation curable resin when a shape is transferred using an ionizing radiation curable resin, a compound having one more acryloyloxy groups in a molecule is preferably used. In order to improve a mechnical strength of an anti-glare surface, three- or more-functional acrylate, that is, a compound having three or more acryloyloxy groups in a molecule is more preferably used. Examples include trimethylolpropane triacrylate, trimethylolethane triacrylate, glycerin triacrylate, pentaerythritol triacrylate, pentaerythritol tetraacrylate, and dipentaerythritol hexaacrylate. In addition, in order to impart flexibility to an anti-glare surface to make cracking difficult, an acrylate compound having an urethane bond in a molecule is also preferably used. Specifically, examples of urethane acrylate such include an adduct of two molecules of compounds having an acryloyl group and at least one hydroxyl group in a molecule such as trimethylolpropane diacrylate and pentaerythritol triacrylate, and an isocyanate compound such as hexamethylene diisocyanate and tolylene diisocyanate. Besides, other acrylate resins which initiate radical polymerization with ionizing radiation and cure the system, such as ether acrylates, ester acrylates may be used.

Alternatively, cationic polymerizable ionizing radiation curable resins such as epoxy resins and oxetane resins may be used as a resin to which irregularities are shaped after curing. In this case, a mixture of a cationic polymerizable functional oxetane compound such as 1,4-bis[(3-ethyl-3-oxetanylmethoxy)methyl]benzene and bis(3-ethyl-3-oxetanylmethyl)ether, and an photocationic initiator such as (4-methylphenyl)[4-(2-methylpropyl)phenyl]iodonium hexafluorophosphate is used.

When an acrylic ionizing radiation curable resin is cured by irradiation with ultraviolet-ray, in order to generate a radical when receives ultraviolet irradiation, and initiate a polymerization and curing reaction, an ultraviolet radical initiator is used by addition. Irradiation with ultraviolet-ray is performed from a glass template surface side, or a transparent resin film surface side and irradiation with ultraviolet-ray is performed from a transparent resin film surface side, an initiator which initiates a radical reaction in a visible region to an ultraviolet region in order to initiates a radical reaction in a wavelength region of ultraviolet-ray which transmits a film.

As a ultraviolet-ray radical initiator which initiates a radical reaction by irradiation with ultraviolet-ray, in addition to 1-hydroxycyclohexylphenylketone, 2-methyl-1-[4-(methylthio)phenyl]-2-morpholinopropane-1-one, and 2-hydroxy-2-phenyl-1-phenylpropane-1-one, a phosphorus series optical radical initiator having absorption in a visible region such as bis(2,4,6-trimethylbenzoyl)phenylphosphine oxide, bis(2,6-dimethoxybenzoyl)-2,4,4-trimethylpentylphosphine oxide, and 2,4,6-trimethylbenzoyldiphenylphosphine oxide is suitably used, in particular, when a ultraviolet curable resin is cured by irradiating ultraviolet-ray through a transparent resin containing a ultraviolet absorbent.

An ionizing radiation curable resin (ultraviolet curable-resin) is prepared into a coating solution in the state where mixed with an initiator as necessary, or in a form of a solution a resin is dissolved in a solvent as necessary. Coating of a coating solution on a transparent substrate film can be performed by an arbitrary method such as bar coating, roll coating, dip coating, gravure coating, and microgravure coating. After coating, a coated resin is subjected to drying treatment as necessary.

When a glass template having the surface on which fine irregularities are formed by etching treatment is plate-like, ionizing radiation is irradiated from a transparent resin film surface side for a glass template surface side in the state a template surface and a transparent resin film with an uncured ionizing radiation curable resin coated thereon are adhered so that a template surface is contacted with a coated surface, to cure an ionizing radiation curable resin, which was peeled from a glass template together with a substrate film, and a template shape is transferred onto the surface of a transparent film.

When a glass template is roll-like, and an irregular shape of a template is transferred using an ionizing radiation curable resin, a transparent film is irradiated with ionizing radiation in the state where a surface with an uncured ionizing radiation curable resin coated thereon is adhered to a glass roll and, after curing, this is peeled from a roll template together with a substrate film, thereby, the shape can be continuously transferred onto the surface of a transparent film.

Ionizing radiation maybe ultraviolet-ray or electron beam. From a viewpoint of easy handling and safety, ultraviolet-ray is preferably used. As a light source of ultraviolet-ray, a high pressure mercury lamp, and a metal halide lamp are preferably used. When irradiated through a transparent substrate containing a ultraviolet absorbent, in particular, a metal halide lamp containing much visible light component is suitably used. In addition, "V-Valve" and "D-Valve" (all trade name) manufactured by Fusion Co., Ltd. are preferably used. An amount of irradiation may be an amount sufficient for solidifying a ultraviolet curable resin to an extent that the resin can be released from a template. In order to further improve a surface hardness, irradiation may be performed again from a coated surface side after releasing.

An example of a process for preparing an anti-glare film by forming a glass template in roll-like, continuously transferring irregularities of the template onto a ultraviolet curable resin coated on the surface of a transparent substrate film using the roll-like glass template, and curing this with ultraviolet-ray will be explained based on FIG. 7. In this case, since a glass can be usually obtained in a form of tube, and is subjected to blast treatment and etching treatment in this state, a template roll may be prepared by inserting a rod made of a metal into a hollow part of a glass tube.

Figure 7:
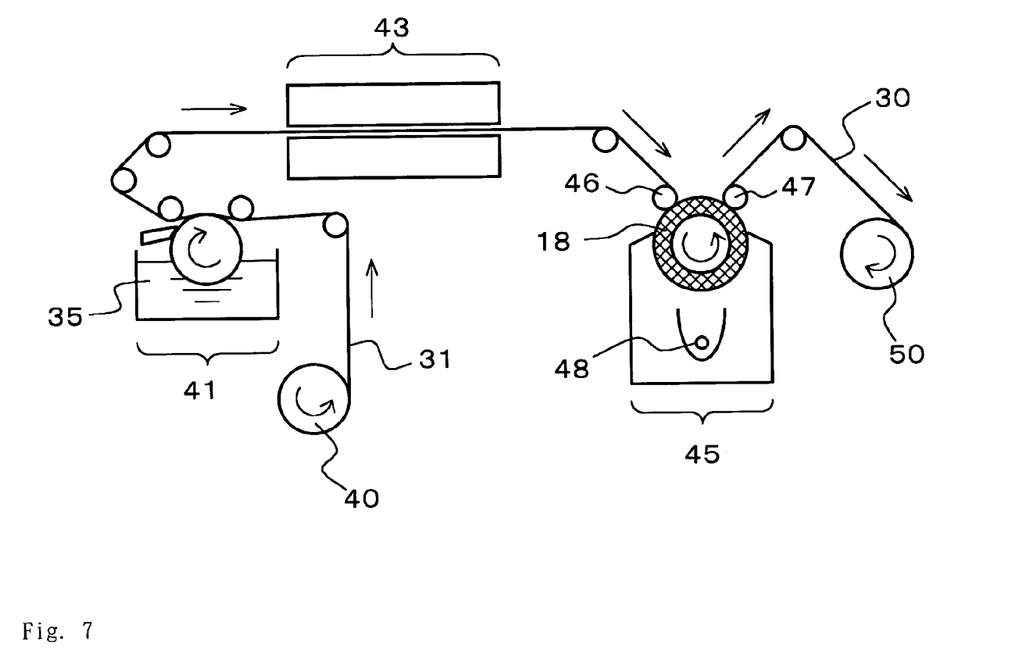
FIG. 7 is a view schematically showing a process for continuously preparing an anti-glare film using a roll-like glass template.

Referring FIG. 7, a substrate film 31 is delivered from a delivery roll 40, a coating solution 35 of an ultraviolet curable resin is coated thereon in a coating zone 41, this is dried in a drying zone 43, and is introduced to a light exposure curing zone 45. In the light exposure curing zone 45, the film is pushed against a roll-like glass template 18 with an inlet side nip roll 46, and irradiated with ultraviolet-ray from a light source 48 in this state, to cure a ultraviolet curable resin. Thereafter, the film passes through an outlet-side nip roll 47, peeled from a template 18, and is wound with a winding roll 50. In the figure, a straight line arrow indicates a direction of film progression, and a curved line arrow indicates a direction of roll rotation.

As described above, since the anti-glare optical film of the present invention is excellent in glare preventing effect, and whitening of the surface is improved-better, when mounted on an image display device, visibility is excellent. When an image display device is a liquid crystal display, this glare preventing optical film may be a polarizing film. That is, a polarizing film is generally of a form in which a protecting film is laminated on at least one side of a polarizer made of a polyvinyl alcohol resin film-onto which iodine or dichromic die is orientation-adsorbed, in many cases. When the aforementioned optical film with glare preventing irregularity imparted is laminated on one side of such the polarizing film, an anti-glare polarizing film is obtained. Alternatively, by using the aforementioned optical film with glare preventing irregularity imparted as an anti-glare layer also functioning as a protecting film, and laminating this on one side of a polarizer so that its irregular surface is on outer side, an anti-glare polarizing film may be obtained. Further, in a polarizing film with a protecting film laminated thereon, by imparting the aforementioned glare preventing irregularity to the surface of a film having one protected surface, an anti-glare polarizing film may be obtained.

In addition, a transparent resin film shaping-treated as described above may be laminated on the surface of a polarizing plate using a pressure-sensitive adhesive or an adhesive, and may be arranged on a front side of a display device. In order to impart anti-glare property to the surface of a polarizing plate by the present method, the present invention can be utilized in preparation of a polarizing plate, by a method of imparting anti-glare property to the surface of a transparent resin film used for protecting the surface of a polarizing plate such as triacetylcellulose by the present method, and laminating this glare preventing film on one side of a polarizer, in addition to a method of using a polarizing plate itself as a transparent resin film.

EXAMPLES

Hereinafter, description will be given of the present invention by way of the following examples; however, the present invention is not limited to the examples.

Example 1

A soda-lime glass having a thickness of 1.1 mm obtained from Nippon Sheet Glass Co., Ltd. was blast-treated with a mono disperse aluminum crystal "Sumicorundum AA-5" (average particle diameter: 5 μm) obtained from Sumitomo Chemical Co., Ltd. A blast pressure was 0.5 kg/cm$^2$ (50 kPa), and a blast time was 120 seconds. Thus blast-treated glass was ultrasound-washed, dried, immersed in 10% by weight hydrofluoric acid at 40° C. for 1,200 seconds, sufficiently washed with pure water, and dried to prepare a template glass.

10 g of a urethaneacrylate ultraviolet curing resin "UA-1" obtained from Shin-Nakamura Chemical Co., Ltd., and 0.5 g of a photopolymerization initiator "Lucirin TPO" (chemical name: 2,4,6-trimethylbenzoyldiphenylphosphine oxide) obtained from BASF Corporation were dissolved in 10 g of ethyl acetate to prepare a coating solution. This coating solution was coated on one side of triacetylcellulose film having a thickness of 80 μm obtained from Fuji Photo Film Co., Ltd. with a #16 bar coater in a dark place. This was dried in an oven at 80° C. for 5 minutes, an coated surface in the uncured state was adhered to a rough surface of a template glass prepared above using a hand roller so that bubbles do not enter, and ultraviolet-ray was irradiated at a light amount of 450 mJ/cm$^2$ from a triacetylcellulose surface side using a high pressure mercury lamp, to cure the ultraviolet curing resin.

A triacetylcellulose film with a ultraviolet curing resin coated thereon was peeled from a glass template to obtain a film having the surface on which fine irregularities were formed. A surface shape of the resulting glare preventing optical film was measured, and it was found that a ratio of planes having an inclination angle of the surface of 1° or less was 19%, a ratio of planes having an inclination angle of the surface of 5° or more was 8%, and a standard deviation of a height was 0.17 μm.

A triacetylcellulose surface of this glare preventing optical film was laminated on a black acrylic resin plate using a transparent adhesive, and its irregular surface was irradiated with the light using a white light source from a direction at inclination of 30° from a film main normal, and change in an angle of reflectivity in a plane containing a film main normal and an irradiation direction was measured. For measuring reflectivity "3292 03 Optical Power Sensor" and "3292 Optical Power Meter" manufactured by Yokogawa Electric Co., Ltd. were used in any cases. As a result, reflectivity in a direction shifted from a specular reflection angle by 20° was 0.00017%. In addition, the anti-glare optical film of the present example laminated on a black acrylic plate was observed in a blight room, whitening hardly occurred, and it was confirmed that considerably better blackness was exhibited.

On the other hand, a triacetylcellulose side of the film obtained in the present example was applied to a glass, a haze and reflection clarity using a 1.0 mm optical comb at 45° introduction were measured, they were 2.0% and 5.8%, respectively, and it was found that a low haze, and high reflection on preventing ability were possessed. In addition, a triacetylcellulose side of the same film was applied to a glass, transmittance clarity was measured using 0.125 mm, 0.5 mm, 1.0 mm and 2.0 mm optical combs, a total value of transmittance clarity of these four kinds was 210%.

Example 2

According to the same manner as that of Example 1 except that a blast particle was changed to "Sumicorundum AA-18" (average particle diameter: 18 μm) obtained from Sumitomo Chemical Co., Ltd., a blast pressure was 0.4 kg/cm$^2$ (40 kPa), and a blast time was 120 seconds, an anti-glare optical film was prepared. Results of optical property and visible assessment of the resulting film are shown in Table 1. It was found that this film also has sufficient anti-glare property and whitening preventing ability.

Comparative Example 1

According to the same manner as that of Example 1 except that "SumicorundumAA-5" was used as a blast particle as in Example 1, a blast pressure was 0.5 kg/cm$^2$ (50 kPa), and a blast time was 10 seconds, an anti-glare optical film was prepared. Results of optical property and visible assessment of the resulting film are shown in Table 1. This film has little whitening, but has considerable reflection on, and it was found that this film is insufficient as an anti-glare film.

Comparative Example 2

According to the same manner as that of Example 2 except that "Sumicorundum AA-18" was used as a blast particle as in Example 2, a blast pressure was 1.0 kg/cm$^2$ (100 kPa), and a blast time was 60 seconds, an anti-glare optical film was prepared. Results of optical property and visible assessment of the resulting film are shown in Table 1. This film has sufficient anti-glare property, but it was found that whitening is very intense.

Comparative Example 3

According to the same manner as that of Example 3 except that a zirconia bead "TZ-B125" was used as a blast particle as in Example 3, a blast pressure was 0.5 kg/cm$^2$ (50 kPa), and a blast time was 20 seconds, an anti-glare optical film was prepared. Results of optical property and visible assessment of the resulting film are shown Table 1. This film has little whitening, but has considerable reflection on, and it was found that this film was insufficient as an anti-glare film.

Comparative Example 4

0.5 g of silica "Sylysia 350" (average particle diameter: 1.8 μm) obtained from Fuji Silysia Chemical Co., Ltd., 10 g of a urethane acrylate ultraviolet curing resin "UA-1" obtained from Shin-Nakamura Chemical Co., Ltd., and 0.2 g of a photopolymerization initiator "Lucirin TPO" obtained from BASF Corporation were mixed into 10 g of ethyl acetate to prepare a coating solution. This coating solution was coated on one side of a triacetylcellulose film having a thickness of 80 μm obtained from Fuji Photo Film Co., Ltd. having a thickness of 80 μm using a #10 bar coater in a dark place, ultraviolet-ray was irradiated at alight amount of 450 mJ/cm$^2$ using a high pressure mercury lamp to cure the ultraviolet curing resin. Results of optical property and visible assessment are shown in Table 1. This film has sufficient anti-glare property, but it was found that whitening is very intense.

hexaacrylate which is a resin component, to obtain a ultraviolet curing resin solution. This ultraviolet curing resin solution was coated on a triacetylcellulose film manufactured by Fuji Photo Film co., Ltd. using a #20 bar coater, and dried at 80° C. for 5 minutes. This coated film was adhered to a glass plate having the surface on which irregularities had been formed by the aforementioned etching using a hand roller so that a side coated with a ultraviolet curing resin was an etching side of a glass plate, and irradiated with ultraviolet-ray for 1 minute using a high pressure mercury lamp.

TABLE 1

| | Inclination histogram | | Optical property | | | | | Visible assessment | |
|---|---|---|---|---|---|---|---|---|---|
| | 1° or more | 5° or more | Standard deviation of height | Reflectivity in a direction shifted by 20° | Haze | Reflection clarity | Transmittance clarity | Whitening (*1) | Reflection on (*2) |
| Example | | | | | | | | | |
| 1 | 19% | 8% | 0.17 μm | 0.00017% | 2.0% | 5.4% | 210% | ◎ | ○ |
| 2 | 12% | 15% | 0.16 μm | 0.00046% | 5.3% | 14.7% | 202% | ◎ | ○ |
| Comparative Example | | | | | | | | | |
| 1 | 35% | 20% | 0.25 μm | 0.0017% | 5.6% | 15.2% | 233% | ◎ | X |
| 2 | 5% | 55% | 0.77 μm | 0.018% | 47% | 14.2% | 185% | X | ○ |
| 3 | 44% | 4% | 0.04 μm | 0.00012% | 2.2% | 19.8% | 212% | ◎ | X |
| 4 | 8% | 49% | 0.51 μm | 0.0073% | 20% | 5.1% | 34.2% | Δ | ○ |

(*1) Whitening ◎: Considerably better (no whitening)
Δ: Whitening
X: Extremely whitening
(*2) Reflection on ○: Feel disinclined
X: Outline of reflected on image is seen

Example 3

A borosilicate glass plate (trade name "Pyrex"; 5 cm square, 4 mm thickness; purchased by designating size and thickness) manufactured by Asahi Techno Glass Co., Ltd. was blast-treated using a zirconia bead (trade name "TZ-B53", average particle diameter 53 μm, approximately monodisperse) manufactured by Tosoh Co., Ltd. An amount of a blast agent (zirconia bead) used was 100 ml, a blast pressure was 0.03 MPa, a distance from a blast nozzle to a glass plate was 40 cm, and a blast gun was fixed. Blast treatment was completed in about 5 minutes. A glass after blast treatment remained approximately transparent, but when observed with a reflection-type microscope manufactured by Keyence Corporation, it was confirmed that many fine cracks were produced on the surface at a depth of about 1 to 1.5 μm.

A glass after blast was immersed in an etching solution of weight ratio 5/1/1/10 of hydrogen fluoride (HF)/ammonium fluoride ((NH$_4$)$_2$ SO$_4$)/sulfuric acid (H$_2$SO$_4$)/water at a temperature of 40° C. for 1 hour, to perform etching and, thereafter, this was washed with pure water. An etching depth was 100 μm. When a surface shape was observed by the reflection-type microscope described above, it was confirmed that the product has a shape that the whole surface was covered with fine spherical concave parts, and a flat part is not present.

Separately, a photopolymerization initiator "Lucirin TPO" (manufactured by BASF Corporation, chemical name: 2,4,6-trimethylbenzoyldiphenylphosphine oxide) was added to a 50% solution of dipentaerythrytol hexaacrylate in ethyl acetate at 5 parts per 100 parts of dipentaerythrytol Thereafter, a triacetylcellulose film on which a curable resin had been cured was peeled from a glass plate, to obtain an anti-glare film.

Display property of the resulting glare preventing film was assessed as follows. That is, a polarizing plate on a displace side was peeled from a personal computer carrying a commercially available twist nematic-type TFT liquid crystal display element, and a polarizing plate "SR1862AP" manufactured by Sumitomo Chemical Co., Ltd. was applied thereto so that an absorbing axis of a polarizing plate was consistent with an original polarizing plate. The aforementioned glare preventing film was applied on this polarizing plate via an adhesive on its triacetylcellulose film side. A personal computer was on, and display of a liquid crystal display device was assessed with naked eyes as the black state in a light room. As a result, it was confirmed that the reflected light towards an observer side was sufficiently reduced, and reflection on of the outdoor daylight was hardly observed in the black state, sufficient anti-glare property was possessed, and considerable better display property was possessed.

Example 4

According to the same manner as that of Example 3 except that a zirconia bead "TZ-SX17" (average particle diameter: 35 μm, approximately monodisperse) manufactured by Tosoh Co., Ltd. was used as a blast particle, and a blast pressure was 0.04 MPa, an anti-glare film was obtained. According to the same manner as that of Example 5, assessment was performed, and it was confirmed that the reflected light towards an observer side was sufficiently reduced, the reflected on outdoor daylight was hardly observed in the black state, sufficient anti-glare property was possessed, and considerably better display property was possessed.

Example 5

According to the same manner as that of Example 3 except that a zirconia bead "TZ-B90" (average particle diameter: 90 μm, approximately monodisperse) manufactured by Tosoh Co., Ltd. was used as a blast particle, and a blast pressure was 0.03 MPa, an anti-glare film was obtained. According to the same manner as that of Example 5, assessment was performed, and it was confirmed that the reflected light towards an observer side was sufficiently reduced, the reflected on outdoor daylight was hardly observed in the black state, sufficient anti-glare property was possessed, and considerably better display property was possessed.

Example 6

Using a borosilicate glass tube (trade name "Pyrex", 90 mmϕ, glass thickness: 2.4 mm, purchased by designating a diameter) manufactured by Asahi Techno Glass Co., Ltd. as a glass, blast procedure was performed under the same conditions as those of Example 3. Thereafter, using the same composition of an etching solution as that of Example 5, etching was performed at 40° C. for 1.5 hours. An etching depth was 150 μm. A template roll was obtained by placing a metal rod into a hollow part of the thus etched glass tube.

Separately, a triacetylcellulose film was continuously supplied, and a ultraviolet curable resin having the same composition as that of Example 3 was continuously coated on its surface with a microgravure coater, dried, guided in a light exposure curing zone in which the aforementioned glass template roll was disposed, ultraviolet-ray from a high pressure mercury lamp was irradiated while contacting with a template roll on a ultraviolet curable resin coated side for about 3 seconds and, thereafter, the film was peeled from a template roll and wound, whereby, an anti-glare film in which an irregular plane of a ultraviolet curable resin was formed on a triacetylcellulose film was continuously prepared. The resulting glare preventing film was assessed according to the same manner as that of Example 3, and it was confirmed that the reflected light towards an observer side was sufficiently reduced, the reflected on outdoor daylight was hardly observed in the black state, sufficient anti-glare property was possessed, and considerably better display property was possessed.

Example 7

According to the same manner as that of Example 6 except that a blast pressure was 0.01 MPa, an anti-glare film was obtained. According to the same manner as that of Example 3, assessment was performed, and it was confirmed that the reflected light towards an observer side was sufficiently reduced, the reflected on outdoor daylight was hardly observed in the black state, sufficient anti-glare property was possessed, and considerably better display property was possessed.

Comparative Example 5

According to the same manner as that of Example 3 except that "Morundum A #80" (manufactured by Showa Denko Co., Ltd.) which is an alumina particle having wide particle diameter distribution, a ununiform shape, and an average particle diameter of about 200 μm was used as a blast particle, and a blast pressure was 0.02 MPa, an anti-glare film was obtained. When the surface of a glass template prepared in this Example was observed with a reflection-type microscope, a size of a concave part was ununiform, and a large concave part was dispersed. In addition, the resulting glare preventing film was assessed as in Example 3, and it was confirmed that the film has sufficient anti-glare property, but has rough surface state, and great glittering, and comprehensive visibility is not sufficient.

Comparative Example 6

According to the same manner as that of Example 3 except that "Morundum A #220" (manufactured by Showa Denko Co., Ltd.) which is an alumina particle having a ununiform shape, and a particle diameter distributed between about 45 μm and about 75 μm was used as a blast particle, and a blast pressure was 0.02 MPa, an anti-glare film was obtained. The surface of a glass template prepared in this Example was observed with a reflection-type microscope, a size of a concave part was also ununiform, and a great concave part was dispersed. In addition, the resulting glare preventing film was assessed as in Example 3, and it was confirmed that the film has sufficient anti-glare property, but has rough surface state, and great glittering, and comprehensive visibility is not sufficient.

Comparative Example 7

According to the same manner as that of Example 3 except that a blast pressure was 0.1 MPa, an anti-glare film was obtained. When the surface of a glass template prepared in this example was observed with a reflection-type microscope, a size of a concave part was ununiform, and a great concave part was dispersed. The resulting glare preventing film was assessed as in Example 3, and it was confirmed that the film has sufficient anti-glare property, but has rough surface state, and great glittering, and comprehensive visibility is not sufficient.

Comparative Example 8

According to the same manner as that of Example 3 except that a zirconia bead "TZ-SX17" (average particle diameter: 35 μm, approximately monodisperse) manufactured by Tosoh Co., Ltd. was used as a blast particle, and a blast pressure was 0.01 MPa, an anti-glare film was obtained. The surface of a glass template prepared in this example was observed with a reflection-type microscope, many flat parts were recognized. This was thought as follows. A blast particle (zirconia bead) used in this example was comparatively small as having an average particle diameter of 35 μm, and this was blasted at a low blast pressure at 0.01 MPa. The anti-glare film obtained in this example was assessed as in Example 3, and it was confirmed that the film has extremely insufficient glare preventing performance and inferior visibility. Incidentally, even in the case of the same zirconia bead "TZ-SX17" as that used in this example, as shown in Example 4, when a blast pressure is raised to around 0.04 MPa, an anti-glare film having sufficient performance can be obtained.

Main conditions and results of the above examples and comparative examples are summarized in Table 2.

TABLE 2

| Experimental No. | Template glass | Blast particle Trade name | Blast particle Particle diameter | Blast pressure | Result Blackness in black state | Anti-glare property |
|---|---|---|---|---|---|---|
| Example 3 | Plate-like | TZ-B53 | 53 μm | 0.03 MPa | Black | Better |
| Example 4 | Plate-like | TZ-SX17 | 35 μm | 0.04 Mpa | Black | Better |
| Example 5 | Plate-like | TZB90 | 90 μm | 0.03 Mpa | Black | Better |
| Example 6 | Roll-like | TZ-B53 | 53 μm | 0.03 Mpa | Black | Better |
| Example 7 | Roll-like | TZ-B53 | 53 μm | 0.01 Mpa | Black | Better |
| Comparative Example 5 | Plate-like | Morundum A #80 | 200 μm (Broad) | 0.02 Mpa | Rough, whitening | Better |
| Comparative Example 6 | Plate-like | Morundum A #220 | 45-75 μm (Broad) | 0.02 MPa | Rough, whitening | Better |
| Comparative Example 7 | Plate-like | TZ-B53 | 53 μm | 0.1 Mpa | Rough, whitening | Better |
| Comparative Example 8 | Plate-like | TZ-SX17 | 35 μm | 0.01 Mpa | Whitening | Great reflection on |

The anti-glare optical film of the present invention properly controls distribution of an inclination angle of the surface on which irregularities are formed, is excellent in glare preventing effect, can prevent so-called whitening when mounted on an image display device including a liquid crystal display device, and can further improve visibility of an image display device. Further, by controlling also optical property of a film, such the effect becomes further remarkable. In addition, according to the present invention, since a glass having the surface on which fine irregularities are formed is used as a template, the anti-glare optical film with a prescribed surface irregular shape formed thereon can be prepared at a large amount and at a constant quality. By making a glass template tubular (roll-like), such the anti-glare optical film can be continuously prepared in a roll-manner. And, when formation of irregularities on glass surface is performed by a prescribed method, an anti-glare film having fine irregularities on surfaces so that approximately spherical convex shapes are disposed substantially compactly can be prepared, and this gives high glare preventing effect when applied to a display plane of various displays including a liquid crystal display device, and whitening of a screen becomes small.

What is claimed is:

1. An anti-glare optical film having an irregular surface, wherein 60% or more of the irregular surface has an inclination angle of 1° or more to 5° or less,
   and
   a standard deviation of concave and convex heights on the surface is 0.2 μm or less.

2. The anti-glare optical film according to claim 1, wherein reflectivity in a direction shifted from a specular reflection angle by 20° is 0.001% or less.

3. The anti-glare optical film according to claim 1, wherein a 45° reflection clarity measured by an optical comb having a width between a dark part and a light part of 1.0 mm is 50% or less.

4. The anti-glare optical film according to claim 1, wherein a total value of transmittance clarities measured by four kinds of optical combs having a width between a dark part and a light part of 0.125 mm, 0.5 mm, 1.0 mm and 2.0 mm is 200% or more.

5. The anti-glare optical film according to claim 1, wherein the film has a haze value of 10% or less.

* * * * *